US012783226B2

(12) United States Patent
Kuwabara et al.

(10) Patent No.: US 12,783,226 B2
(45) Date of Patent: Nov. 3, 2026

(54) PROVIDING METHOD OF VEHICLE SOFTWARE AND PROVIDING SYSTEM OF VEHICLE SOFTWARE

(71) Applicant: DENSO CORPORATION, Kariya-city (JP)

(72) Inventors: Motoaki Kuwabara, Kariya-city (JP); Yoshitaka Kaseda, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 216 days.

(21) Appl. No.: 18/595,516

(22) Filed: Mar. 5, 2024

(65) Prior Publication Data

US 2024/0303071 A1 Sep. 12, 2024

(30) Foreign Application Priority Data

Mar. 10, 2023 (JP) ................................ 2023-037634

(51) Int. Cl.
*G06F 9/44* (2018.01)
*G06F 8/65* (2018.01)

(52) U.S. Cl.
CPC ...................................... *G06F 8/65* (2013.01)

(58) Field of Classification Search
CPC ......................................................... G06F 8/65
See application file for complete search history.

(56) References Cited

U.S. PATENT DOCUMENTS

2016/0294614 A1* 10/2016 Searle ..................... G06F 8/654
2016/0371077 A1* 12/2016 Moeller .................. G06F 8/654
2018/0336024 A1* 11/2018 Klische ..................... G06F 8/65
2019/0034185 A1* 1/2019 Fox ......................... G06F 8/656
2019/0158402 A1 5/2019 Koike
2020/0279044 A1* 9/2020 Lum ......................... G06F 8/65

FOREIGN PATENT DOCUMENTS

JP 2019-096943 A 6/2019

* cited by examiner

*Primary Examiner* — Qamrun Nahar
(74) *Attorney, Agent, or Firm* — Harness, Dickey & Pierce, P.L.C.

(57) ABSTRACT

A providing method of vehicle software includes: registering various types of information necessary for vehicle software generation as basic data in association with target vehicle software; receiving update data including package information and update information, the package information specifying the target vehicle software, and the update information indicating update contents for the basic data and being described in a predetermined format; checking a format of the received update data; specifying the target vehicle software based on the update data; transferring the update data to a development environment of the specified target vehicle software; instructing generation of new vehicle software in which the update data is to be reflected; generating the new vehicle software in which the update data is reflected; and providing the generated new vehicle software.

10 Claims, 16 Drawing Sheets

FIG. 3

ROUTING MAP

| RECEIVED FRAME ID | RELAY DESTINATION |
|---|---|
| 11, 14, 21, 24, 31 | CH1 |
| 15, 17, 38, 71 | CH2 |
| 11, 29, 51, 42 | CH3 |
| 13, 17, 35 | CH4 |
| 11, 14, 17, 29, 71 | CH5 |

FIG. 4

COMMUNICATION SPECIFICATION

| FRAME ID | RELAY SOURCE | | | | | RELAY DESTINATION | | | | |
|---|---|---|---|---|---|---|---|---|---|---|
| | CH1 | CH2 | CH3 | CH4 | CH5 | CH1 | CH2 | CH3 | CH4 | CH5 |
| 17 | S | | | | | | D | | D | D |
| 38 | S | | | | | | D | D | | |
| 11 | | S | | | | D | | D | | D |
| 31 | | S | | | | D | | | | |
| 14 | | S | | | | D | | | | D |
| 29 | | S | | | | | | D | | D |
| 15 | | | S | | | | D | | | |
| 24 | | | S | | | D | | | | |
| 71 | | | | S | | | D | | | D |
| 21 | | | | S | | D | | | | |
| 35 | | | | | S | | | | D | |
| 42 | | | | | S | | D | | | |
| 51 | | | | | S | | | D | | |
| 13 | | | | | S | | | | D | |
| ⋮ | | | | | | | | | | |

FIG. 11

PACKAGE INFO

| | |
|---|---|
| TARGET SOFTWARE | GATEWAY SOFTWARE |
| VERSION | 1.1 |
| FILE NAME | RM_004.7z |
| PROJECT NAME | Prj004 |

PROVIDING METHOD OF VEHICLE SOFTWARE AND PROVIDING SYSTEM OF VEHICLE SOFTWARE

CROSS REFERENCE TO RELATED APPLICATION

The present application claims the benefit of priority from Japanese Patent Application No. 2023-037634 filed on Mar. 10, 2023. The entire disclosure of the above application is incorporated herein by reference.

TECHNICAL FIELD

The present disclosure relates to a providing method of vehicle software and a providing system of vehicle software.

BACKGROUND

As well known, operations of vehicle devices mounted on a vehicle are controlled by vehicle software.

SUMMARY

A providing method of vehicle software includes: registering various types of information necessary for vehicle software generation as basic data in association with target vehicle software; receiving update data including package information and update information, the package information specifying the target vehicle software, and the update information indicating update contents for the basic data and being described in a predetermined format; checking a format of the received update data; specifying the target vehicle software based on the update data; transferring the update data to a development environment of the specified target vehicle software; instructing generation of new vehicle software in which the update data is to be reflected; generating the new vehicle software in which the update data is reflected; and providing the generated new vehicle software.

BRIEF DESCRIPTION OF DRAWINGS

Objects, features and advantages of the present disclosure will become apparent from the following detailed description made with reference to the accompanying drawings. In the drawings:

FIG. 3 is a diagram showing an example of a routing map;

FIG. 4 is a diagram showing an example of a communication specification;

FIG. 11 is a diagram showing an example of package information;

DETAILED DESCRIPTION

Figure 1:
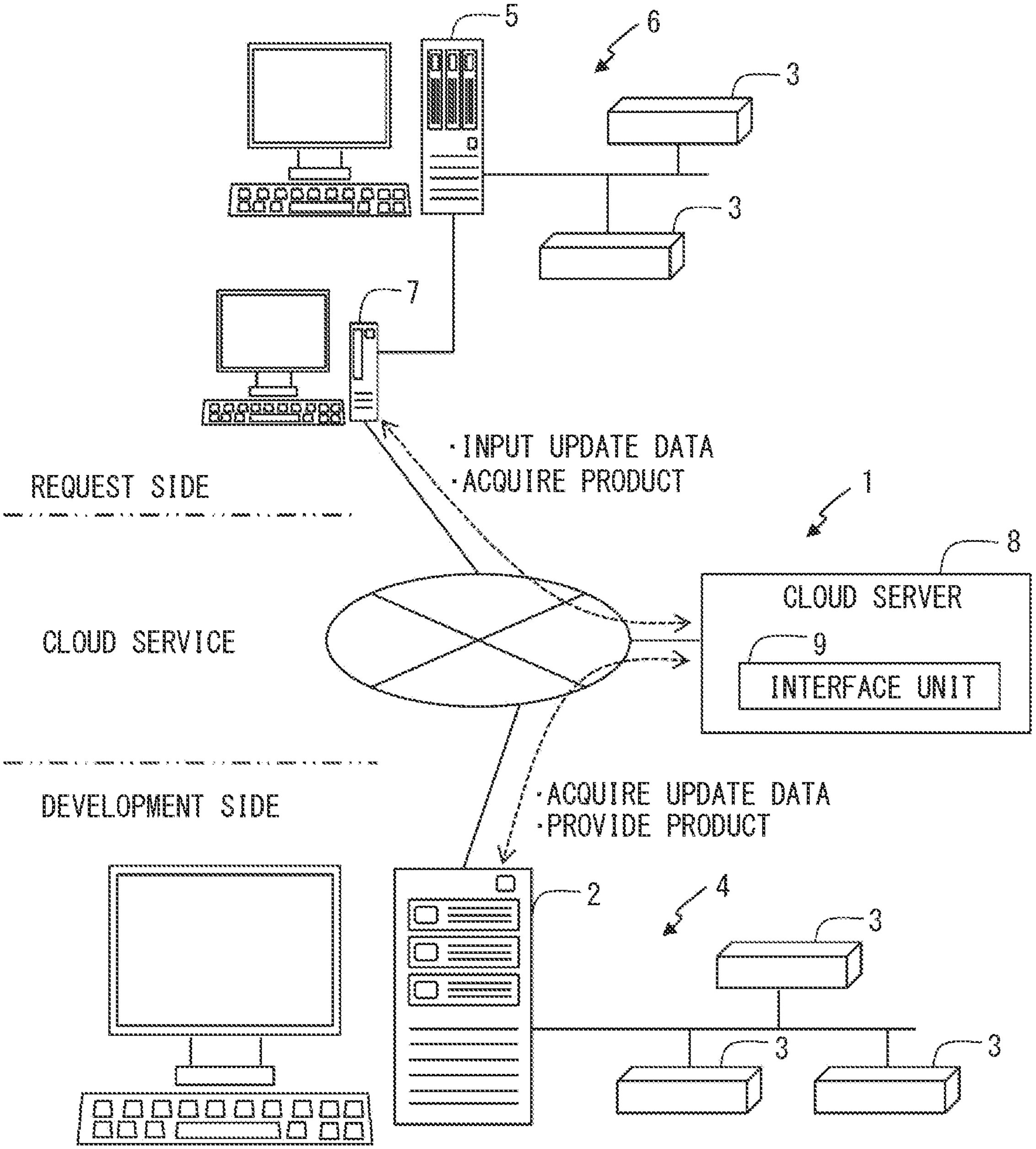
FIG. 1 is a diagram illustrating a schematic configuration of a providing system according to an embodiment.

There has been known a software for vehicle use that performs, in a relay device mounted on a vehicle, processing of determining a transmission destination of a received communication frame and relaying communication between communication nodes. Hereinafter, the software for vehicle use is also referred to as vehicle software.

In the development of such vehicle software, a request side who establishes specifications and requests development may be different from a development side who actually performs development of the vehicle software. In this case, it is necessary to transfer a file such as the specification to the development side at the time of request, and transfer a file such as a product or an evaluation result generated in a predetermined format to the request side at the time of development completion. Conventionally, files have been transferred using electronic mail or a file transfer service.

Therefore, in the development of vehicle software, the provided file is stored in a predetermined place such as a server, a person in charge of development reads out the stored specification, confirms the content of specification by making question and answer (QA) if necessary, generates the vehicle software by inputting information described in the specification to a development environment, and provides the generated vehicle software and an evaluation result thereof to the request side.

In the conventional art, man-hours are required for storing of files, confirmation of specifications, and input of information to a development environment. For example, even when a simple specification change, such as change of a parameter is requested, the request side and the development side need to follow a regular request procedure, and thus the time required to obtain vehicle software in which the changed content is reflected tends to be increased.

According to an aspect of the present disclosure, a providing method of vehicle software includes: registering various types of information necessary for vehicle software generation as basic data in association with target vehicle software; receiving update data including package information and update information, the package information specifying the target vehicle software, and the update information indicating update contents for the basic data and being described in a predetermined format; checking a format of the received update data; specifying the target vehicle software based on the update data; transferring the update data to a development environment of the specified target vehicle software; instructing generation of new vehicle software in which the update data is to be reflected; generating the new vehicle software in which the update data is reflected; and providing the generated new vehicle software.

With the above providing method of vehicle software, it is capable of reducing man-hours in developing of vehicle software and quickly providing vehicle software in which a request content is reflected.

The following will describe embodiments of the present disclosure with reference to the drawings. An example of vehicle software providing system 1 illustrated in FIG. 1 enables transferring of various types of information required for development and transferring of product such as vehicle software for which development has been completed and evaluation results of the vehicle software between a request side that requests development of vehicle software and a development side that actually performs development. Hereinafter, a service that enables transferring of various types of information and product using the providing system 1 is referred to as a providing service. In the present embodiment, it is assumed that a person in charge of original equipment manufacturer (OEM) uses the providing service, and various types of information and products are transferred as files. The OEM is also referred to as a finished car manufacturer.

In the development of vehicle software, a specification is determined by a request side that requests the development, and the vehicle software is developed by a development side that actually performs the development based on the provided specification. Therefore, the development side is provided with a development environment 4 including a development device 2 for developing the vehicle software, an evaluation board 3 for actually operating and evaluating the developed vehicle software, and the like. Hereinafter, the evaluation board 3 is also referred to as a real machine.

The request side is provided with an evaluation environment 6, which includes an evaluation device 5 and an evaluation board 3 for evaluating the vehicle software. The evaluation environment 6 is named to distinguish the environment for evaluation use from the environment for development use, that is, the development environment 4. However, a real machine used for the evaluation environment may be the same as that of the development environment. The request side is provided with an operation terminal 7 for using the providing service.

Transfer of files between the request side and the development side is performed using a cloud service. The cloud service is provided by a cloud server 8. The cloud server 8 includes an interface unit 9 that provides a user interface for transferring files. The interface unit 9 includes, as the user interface, a web interface accessible from the outside via a network.

The request side can access the providing system 1, that is, use the providing service by using a browser software on the operation terminal 7. The development side can, via the cloud server 8, acquire update data and provide a product. In the present embodiment, the cloud server 8 and the development device 2 cooperate with each other by a web API, and are configured to automatically transfer files. In other words, on the development side, manpower is not required for file transfer.

The following will describe an example of vehicle software development. In the development of vehicle software, there is a case where a base of vehicle software may already exist and a change part is limited to a constant, a parameter, or the like. As another case, a base of vehicle software may not exist, or although a base of vehicle software exists, development is required to start from a state where a large-scale update with significant change is to be made in the vehicle software although the vehicle software exists as a base. The present disclosure mainly assumes the former case.

Figure 2:
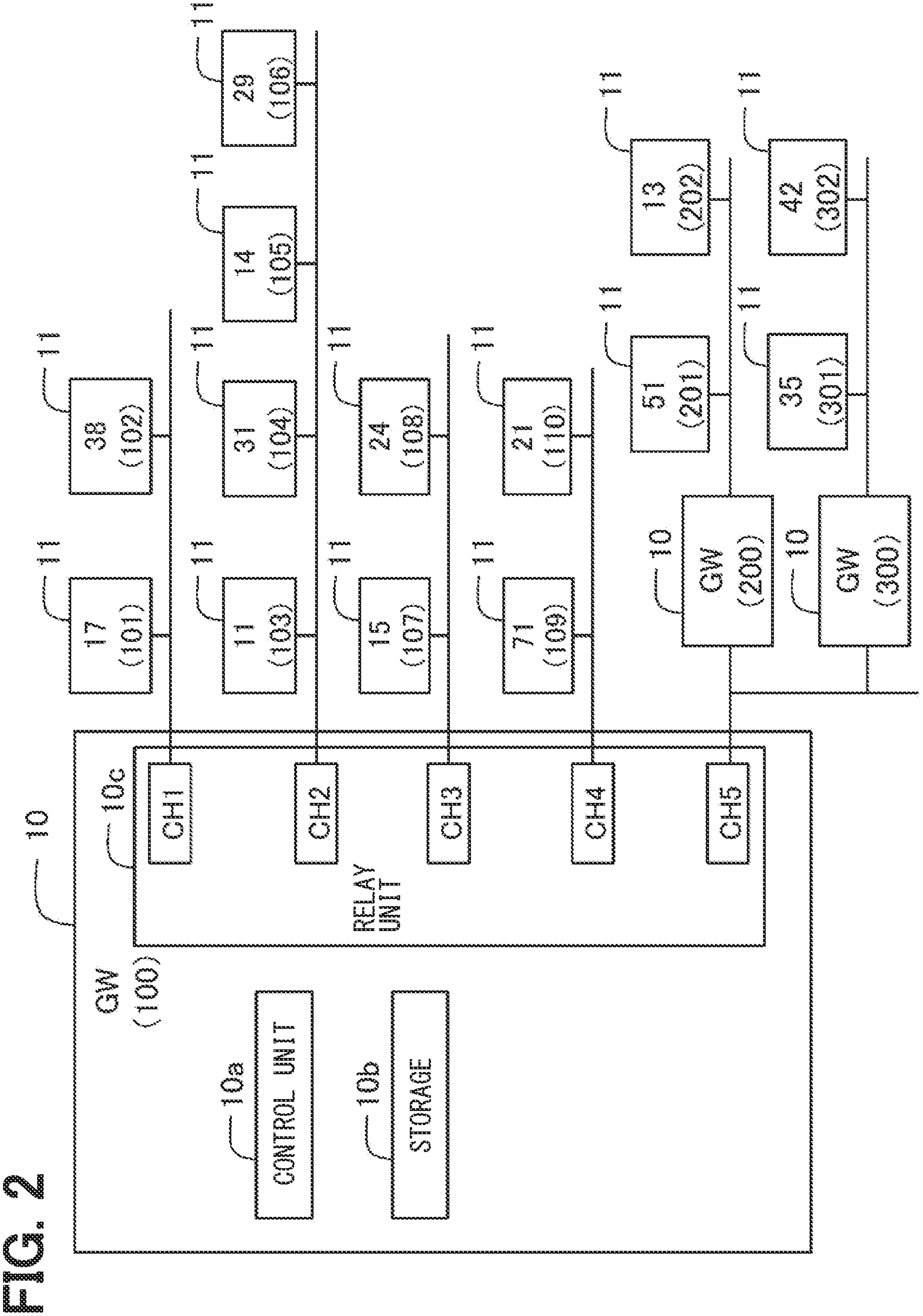
FIG. 2 is a diagram illustrating a configuration of a relay device in which a software for vehicle use is executed.

The following will describe vehicle software that corresponds to a development target. In the present embodiment, software to be used by the relay device 10 illustrated in FIG. 2 is assumed as the vehicle software. When mounted on a vehicle, the relay device 10 is communicably connected to the communication nodes 11 and other relay devices 10. The relay device 10 relays the communication frame transmitted from the communication node 11 connected to each channel of a relay unit **10*c* by executing, with a control unit 10*a*, the vehicle software stored in a storage 10*b*. In FIG. 2, the channel is indicated by CH. The evaluation board 3 has a hardware configuration common to that of the relay device 10**.

Each communication node 11 is provided by an electronic control unit. The relay device 10 and the communication nodes 11 are connected via a communication bus. A protocol of communication via the communication bus may be, for example, controller area network (CAN, registered trademark). The communication protocol may be an Ethernet (registered trademark) protocol. Further, a communication bus adopting a different communication protocol may be used by converting a communication frame in the relay device 10.

In FIG. 2, a numerical value assigned to each communication node 11 indicates a frame ID assigned to each communication frame, and a numerical value in parentheses indicates a unique ID uniquely assigned to each communication node 11 or relay device 10. For example, the communication node 11 with the unique ID "101" is connected to the channel 1 of the relay device 10, and a communication frame with the frame ID "17" is transmitted from the communication node 11. Note that the number of each communication node 11 and the connection mode of the communication nodes 11 illustrated in FIG. 2 are only examples.

The relay device 10 determines a channel to which the received communication frame is to be relayed based on a routing map illustrated in FIG. 3. The routing map includes data in which a received frame ID and a channel serving as a relay destination to which a communication frame having the received frame ID is to be relayed are associated with each other in fixed manner. For example, a communication frame with the received frame ID of "11" is defined to be relayed to channel 1, channel 3, and channel 5. Note that the routing map illustrated in FIG. 3 is an example.

The routing map is generated based on a specification provided by the request side. However, when the number of communication nodes 11 increases or the path becomes complicated, there is a possibility that the correspondence described in the specification is erroneously read or erroneously input at the time of programming. Therefore, in the present embodiment, information necessary for generating the routing map is input as the communication specification in a predetermined format. This communication specification corresponds to update information.

As shown in FIG. 4, the communication specification has cells in a matrix form like a file of spreadsheet software. A list of frame IDs to be relayed by the relay device 10 is associated with a channel functioning as a relay source and a channel functioning as a relay destination. In this communication specification, "S" assigned to the relay source indicates a channel on which the communication frame of the frame ID is received, and "D" assigned to the relay destination indicates a channel on which the communication frame is to be relayed. For example, it is described that a communication frame with a frame ID "17" is received on a channel 1, and the communication frame is to be relayed to a channel 2, a channel 4, and a channel 5. Note that the communication specification shown in FIG. 4 is an example.

When the communication specification is transferred, the development device 2 automatically analyzes the communication specification and generates a routing map according to the communication specification. That is, in the providing system 1, when the target vehicle software is specified and the communication specification corresponding to the vehicle software is input in the predetermined format, the vehicle software corresponding to the communication specification is automatically generated.

Figure 5:
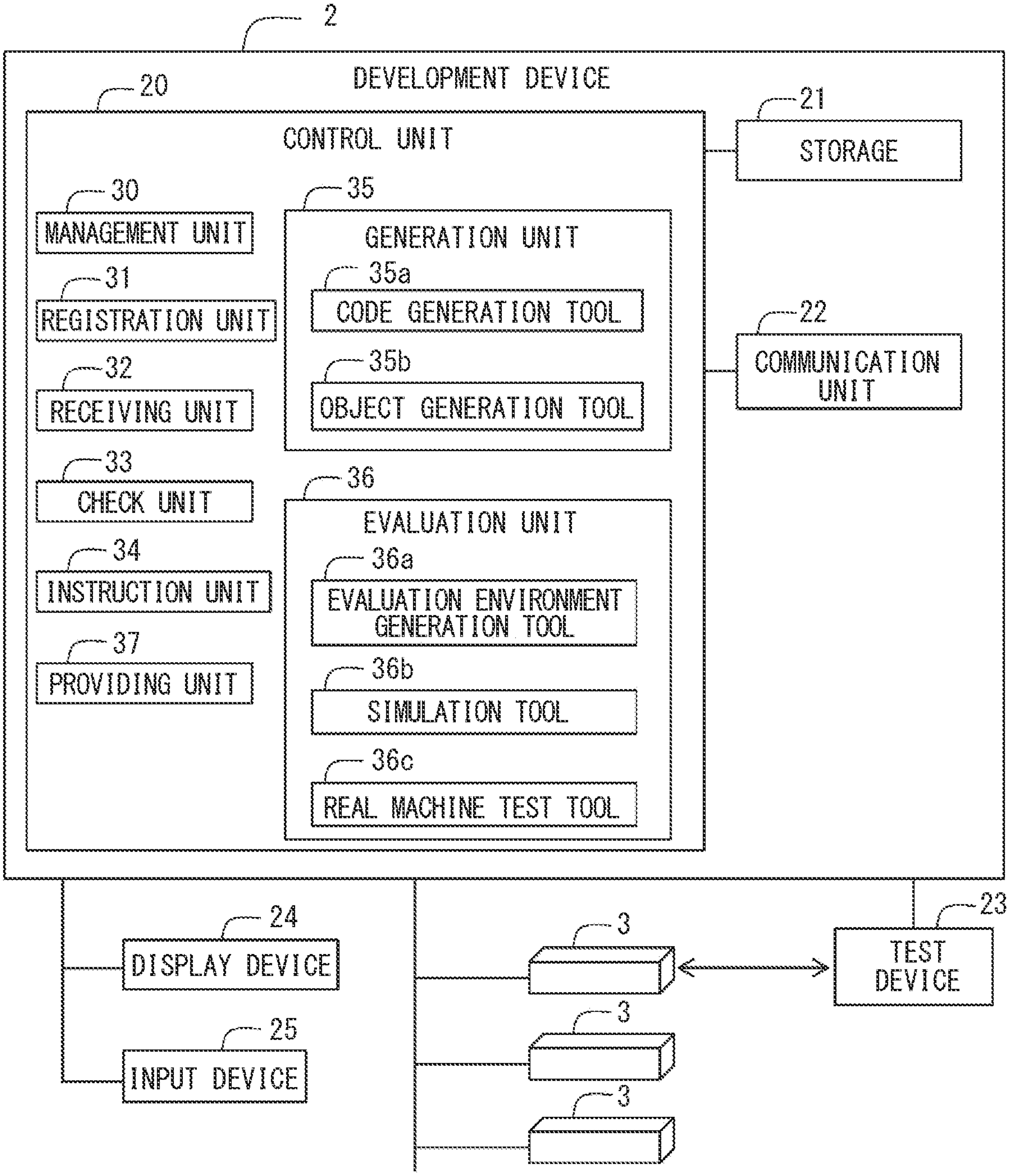
FIG. 5 is a diagram showing a schematic configuration of a development device.

As illustrated in FIG. 5, the development device 2 includes a control unit 20, a storage 21, a communication unit 22, and the like. The control unit 20 is configured by a computer, and controls the entire development device 2 by executing a program stored in the storage 21. The storage 21 is configured by a computer-readable non-volatile non-transistor storage device and stores various data. The storage 21 stores basic data for developing the vehicle software, and the basic data will be described in detail later.

The storage 21 further stores information on the in-vehicle network configuration, and provides the information on the in-vehicle network in response to a request from a generation unit 35 or an evaluation unit 36 of the development device. The information on the in-vehicle network includes, for example, an in-vehicle network configuration, a communication delay time occurring in a relay device included in the in-vehicle network, and a transfer rate of a communication bus. The communication unit 22 performs various types of communication with the cloud server 8, the evaluation board 3, or a test device 23. Note that multiple communication units 22 may be provided to separate the communication unit 22 performing external communication with the cloud server 8 and the communication unit 22 performing internal communication with the evaluation board 3 or the like.

The control unit 20 includes, as functional units, a management unit 30, a registration unit 31, a receiving unit 32, a check unit 33, an instruction unit 34, a generation unit 35, an evaluation unit 36, and a providing unit 37 in order to implement the providing service. These functional units are implemented in software manner by executing a program with the control unit 20.

The management unit 30 manages the entire generation process of vehicle software in the development device 2, and causes each functional unit to execute processing necessary for providing the vehicle software when the update data is input to the cloud server 8. The management unit 30 can individually manage the generation of vehicle software for each project. Therefore, for example, different changes can be made to one piece of vehicle software or different pieces of vehicle software can be developed using the same providing service. The management unit 30 may be provided in the cloud server 8.

The registration unit 31 registers, as basic data, various types of information necessary for generating the vehicle software in association with target vehicle software. The basic data includes information such as a version of the vehicle software, a source code for generating the vehicle software having the version, a header file, a library, and corresponding evaluation board 3. The basic data is registered by a person in charge on the development side using a display device 24, such as a display screen, and an input device 25, such as a keyboard, which are connected to the development device 2. On the development side, the basic data may be generated and registered in the process of developing the vehicle software or developing the evaluation version of vehicle software. Alternatively, the basic data may be input from an outside of the development device 2 via the registration unit 31. The information on the base software, which will be described later, corresponds to version information of the vehicle software. The storage 21 stores, for each version of vehicle software, information, such as a source code and a library for generating the vehicle software having the version and the corresponding evaluation board 3.

The receiving unit 32 receives the update data including the package information for specifying the vehicle software to be developed and the update information indicating the update content for the basic data and described in the predetermined format. That is, the receiving unit 32 acquires the update data input from the request side to be used in the development environment 4 via the interface unit 9.

The check unit 33 checks whether the format of received update data is correct. More specifically, the check unit 33 checks whether the correspondence between the package information and the update information is correct and whether the format of the update information is correct. In the case of the present exemplary embodiment, in the communication specification illustrated in FIG. 4, it is checked whether the same frame ID is duplicated or whether the relay source and the relay destination are defined for the frame ID. The check unit 33 may be provided in the cloud server 8.

The instruction unit 34 specifies the vehicle software to be developed based on the update data, passes the update data to the development environment 4 of the specified vehicle software, and generates new vehicle software in which the update data is reflected.

The generation unit 35 generates new vehicle software in which the update data is reflected based on the instruction from the instruction unit 34. In the generation unit 35, a source code is generated from the update information by a code generation tool 35*a*, and an object of new vehicle software is generated from the source code by an object generation tool 35*b*.

The following will describe the object generation.

The object generation tool 35*b* generates a source code based on the communication specification input from the request side. This source code corresponds to RM code shown in FIG. 12. Further, based on the package information input from the request side, files necessary for generating the vehicle software specified by the package information, such as a header file, a library, and a source file, are acquired from the storage. These files and libraries correspond to product number code shown in FIG. 12. The object generation tool 35*bo* builds files necessary for generating vehicle software, such as a source code, a header file, a library, and a source file based on the communication specification, and generates an execution program of new vehicle software. SW shown in FIG. 12 indicates software. In the build process, for example, processes of a preprocessor, a compiler, an assembler, a linker, and the like are executed. The execution program is also referred to as an object.

The evaluation unit 36 evaluates the generated vehicle software. The evaluation unit 36 includes an evaluation environment generation tool 36*a*, a simulation tool 36*b*, and a real machine test tool 36*c*. The evaluation environment generation tool 36*a* generates an environment for evaluating the relay device 10, such as test data and expected values, based on the communication specification. The test data is generated as data covering all the frame IDs described in the communication specification. The expected values are obtained by, for example, deriving a channel of relay destination for a certain frame ID from a description of communication specification, and is used for comparison with a simulation or an operation in a real machine.

The simulation tool 36*b* is a tool for evaluating vehicle software by simulation using test data and expected values. The real machine test tool 36*c* is a tool for evaluating an actual operation of the vehicle software on the evaluation board 3 by downloading the vehicle software to the evaluation board 3 and transmitting and receiving a dummy communication frame from the test device 23 based on the test data.

The providing unit 37 provides the generated vehicle software and the evaluation result to the request side. In the present exemplary embodiment, the providing unit 37 stores the generated vehicle software in the cloud server so that the request side can acquire the vehicle software as product.

Next, functions and effects of the above-described configuration will be described.

Figure 6:
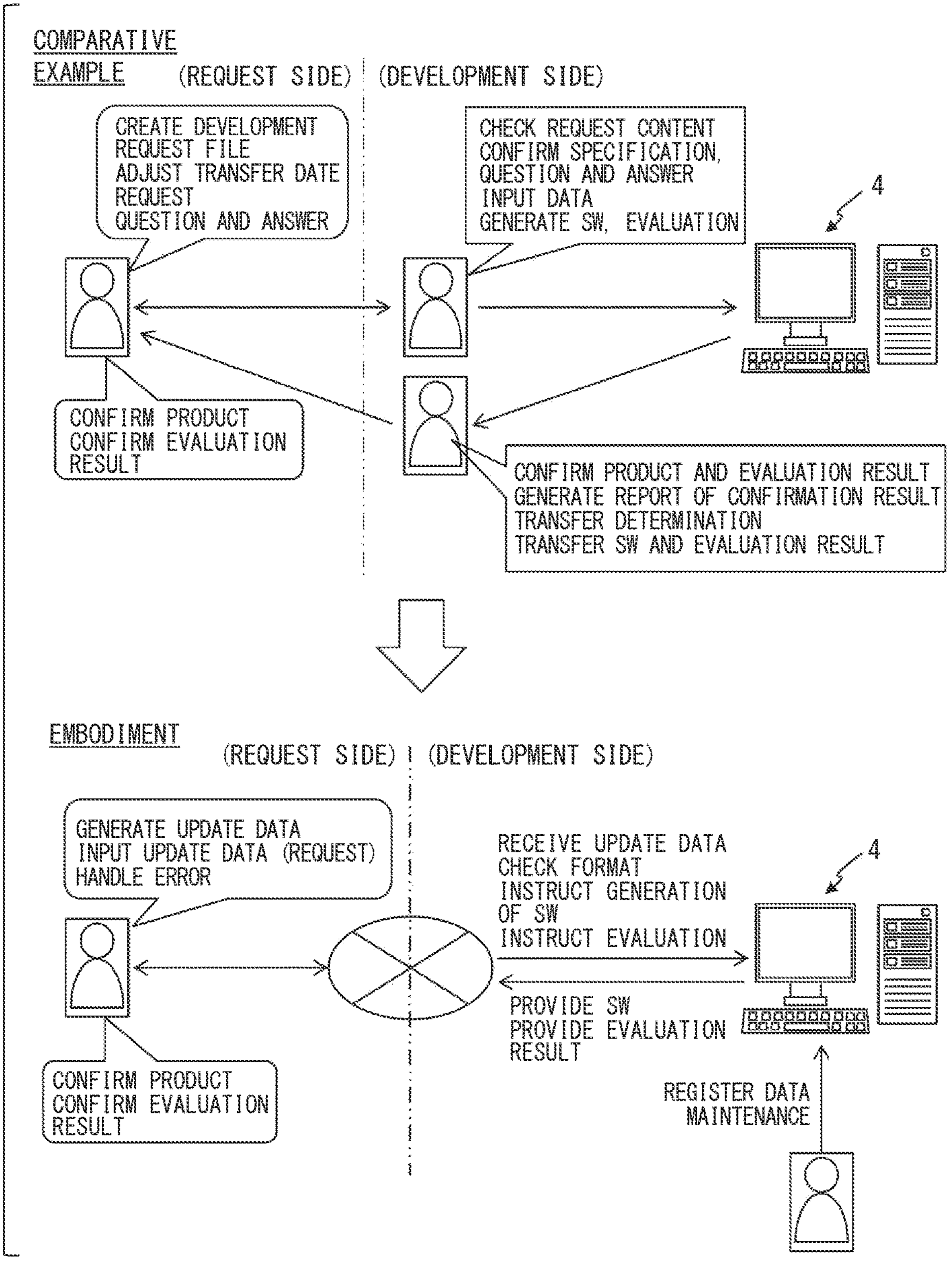
FIG. 6 is a diagram showing a comparison between a conventional development mode and a development mode using the providing system according to the present disclosure.

As described above, in the development of vehicle software, the request side requesting the development may be different from the development side actually performing the development. For example, in the case of development of an OEM product as described in the present embodiment, a company on the request side is usually different from a company on the development side. Therefore, as shown in FIG. 6 as a comparative example, when making a development request, a person in charge on the request side creates a specification, adjusts product transfer and check date, makes a request together with a file of the specification by following a regular request procedure such as an in-house procedure, and performs question handling as necessary. At the completion time of development, files of products, evaluation results, and the like collected in predetermined transfer formats are received. This is because the request side cannot directly operate the development environment 4.

Conventionally, files are transferred using electronic mail or a file transfer service. In this case, in order to develop the vehicle software, the provided file is stored in a predetermined place such as a server, a person in charge of development reads out the stored specification, confirms the request content and the specification, makes question and answer (QA) if necessary, and inputs information described in the specification to the development device 2 to generate the vehicle software. In addition, when the generated vehicle software and the evaluation result are transferred, it is necessary to confirm the product and the evaluation result, collect the product and the evaluation result in a report, and send the vehicle software and the evaluation result after receiving a transfer determination. In FIG. 6, the vehicle software is indicated by SW.

In a related art, when developing the vehicle software, there are many operations requiring manpower both before the development is started and after the development is completed. In other words, both before the start of development and after the completion of development, man-hours and costs are required. For example, when considering a specification change, the request side needs to follow a regular request procedure even for a simple operation of changing an existing parameter, and a time required to obtain vehicle software in which a change content is reflected tends to be increased. FIG. 6 illustrates a comparative example and an embodiment of the present disclosure in an easy-to-understand manner. In FIG. 6, a part of the development process and details of the development process according to embodiment of present disclosure is omitted. In the development process of the vehicle software described in the present embodiment, the development system is constructed so that the intervention by the engineer on the development side is not required at all in the development of the execution program.

Therefore, in the present embodiment, it is possible to reduce man-hours when developing the vehicle software and quickly provide the vehicle software in which the request content is reflected. As shown in FIG. 6 as an example, a use form of the providing service in a situation where the request side can indirectly operate the development environment 4 and the routing map of the vehicle software being developed is changed once, that is, a situation where a parameter of fixed value set in the vehicle software is changed will be described as an example. In the present embodiment, the basic data of the vehicle software is registered in advance, and when the update data is input, all the steps up to the providing of execution program are processed as a series of processes by the computer. Therefore, the vehicle software can be promptly provided to the request side.

Figure 7:
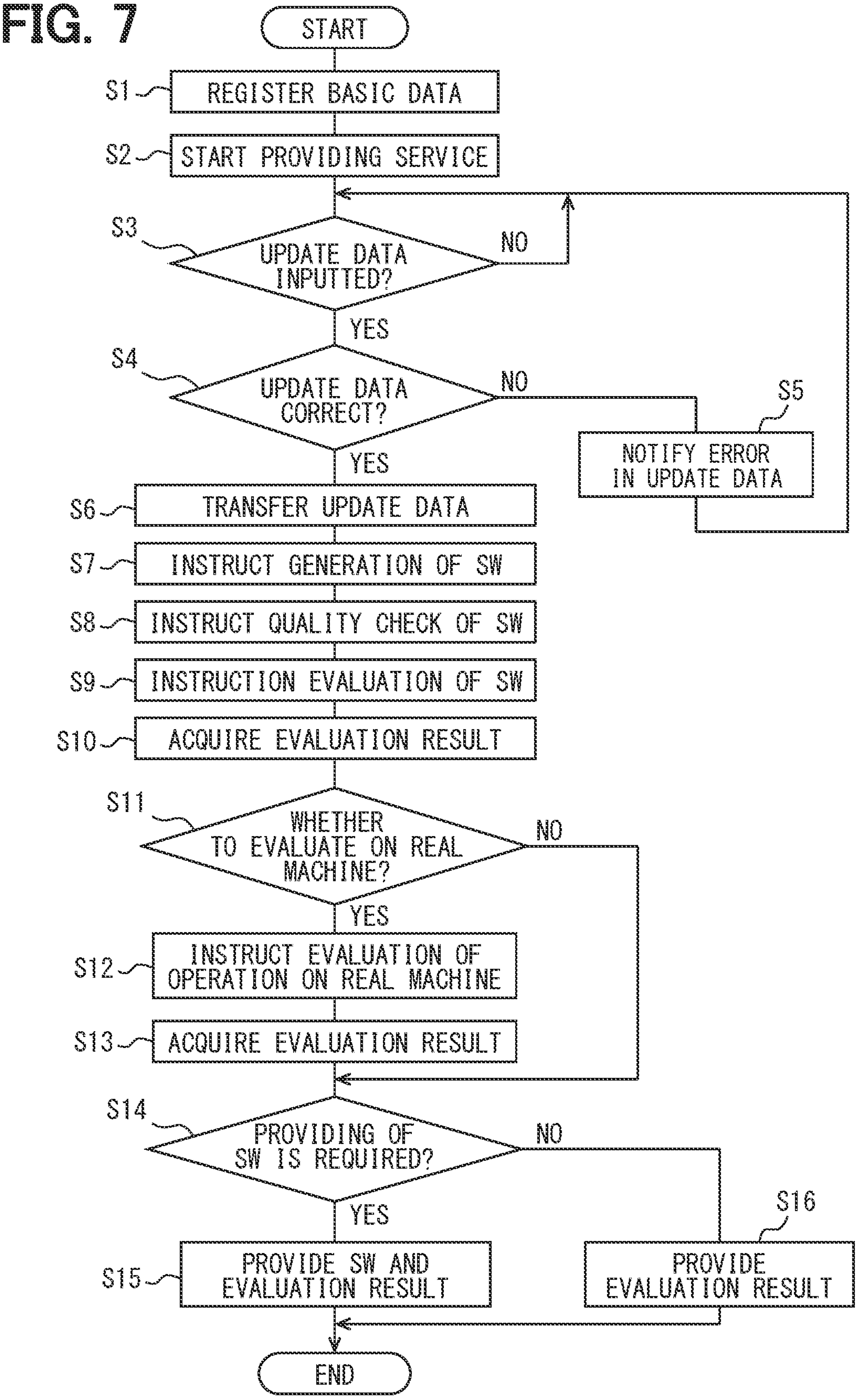
FIG. 7 is a diagram for explaining each step in the providing method of software for vehicle use.

FIG. 7 shows a flow of providing method of vehicle software by the providing system 1. In the providing system 1, first, basic data is registered in S1. In the basic data, various types of information necessary for generating vehicle software are associated with target vehicle software. The basic data includes a source code of vehicle software, a product number code indicating the type of product, and the like. The basic data is registered in a form having an individual file repository for each project.

Subsequently, the providing service is started for the vehicle software in which the basic data is registered in S2. In S2, acceptance of input of update data from the request side is started. Then, the providing system 1 determines whether the update data is input in S3. When the update data is not input (S3: NO), the providing system 1 waits for the input of update data.

When the request side wants to update the routing map, the communication specification is changed. In the communication specification, a communication path in the target vehicle software is defined. The communication specification is provided from the development side to the request side as a product. Alternatively, the communication specification may be provided from the request side to the development side at the time of the development request. Then, for example, when changing the connection mode of the communication node 11 shown in FIG. 2, the request side can define a desired communication path by changing the relay source and the relay destination of the frame ID in the communication specification shown in FIG. 4. At this time, since the frame ID and the like are described as item names in the communication specification, the request side can easily change the communication path even if the request side is not familiar with the development environment 4 or is not familiar with the communication specification.

When the communication specification is updated, the request side accesses the providing system 1 from the operation terminal 7 by the browser software and inputs update data. The following will describe a procedure from login to the providing system 1 to acquisition of product with reference to display window examples. Note that the display windows to be described are only examples, and display windows are also referred to as windows for simplification. Although the request side actually accesses the cloud server 8, it is assumed that the request side accesses the providing service for the sake of simplicity.

Figure 8:
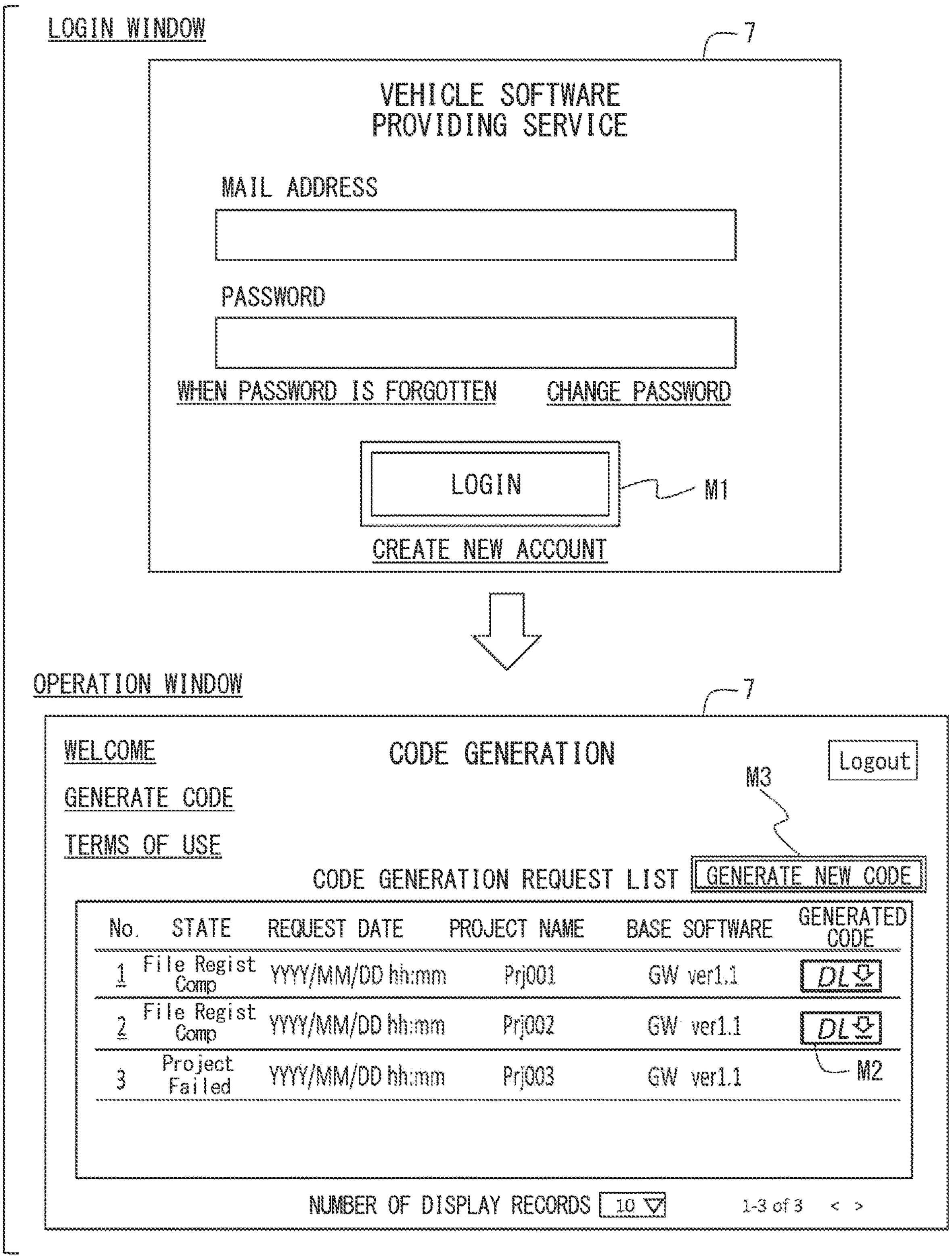
FIG. 8 is a diagram showing an example of a login window and an operation window.

When the request side accesses the providing system 1, for example, a login window as illustrated in FIG. 8 is displayed on the window of the browser software. Then, the request side inputs the mail address or the user ID and the password registered in advance in the input field and presses the login button M1, thereby enabling the login to the providing system 1, that is, the use of the providing service. In the login window, an operation for forgetting a password, an operation for changing a password, and an operation for newly creating an account are also possible.

When the login to the providing system 1 is completed, an operation window is displayed. The request side can request generation of vehicle software by pressing a link of "code generation" on the operation window. On this operation window, information on a project that has already been requested is displayed for each item. The item may include a state, a request date and time, a project name, base software, and generated code.

In the case of FIG. 8, there are three projects for which the developments are requested. For the first and second projects, "File Regist Comp" indicating that the generation of vehicle software is completed is displayed as the state, and a download button is displayed in the generation code. That is, it is indicated that the vehicle software can be acquired for the first and second projects. On the other hand, in the third project, "Project Failed" indicating that the generation of vehicle software has failed is displayed as the state, and the download button M2 is not displayed, which indicates that the generation of vehicle software has failed.

Figure 9:
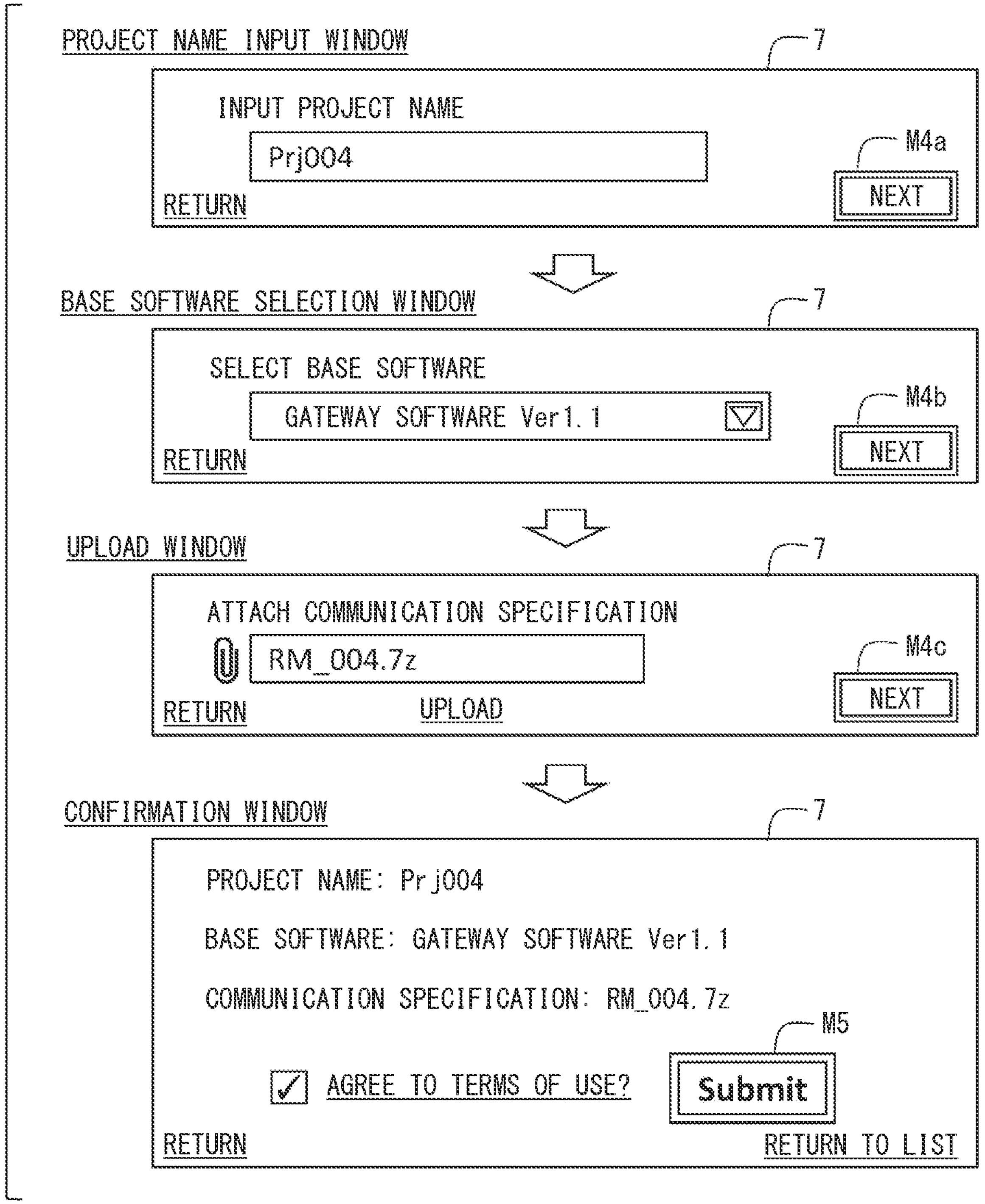
FIG. 9 is a diagram showing an example of a window in which package information is inputted.

The request side can request generation of new vehicle software by pressing a generate new code button on this window. Specifically, when the generate new code button M3 is pressed, a project name input window is displayed as shown in FIG. 9. The request side inputs a proper project name that does not overlap with the existing project, such as Prj004, and presses the next button M4*a*. Then, since a base software selection window for selecting the target vehicle software is displayed, the target base software is selected. In the case of FIG. 9, the gateway software Ver1.1 is selected.

When the next button M4*b* is pressed in this state, an upload window for uploading the communication specification is displayed. Therefore, the request side selects and uploads a file obtained by compressing the created communication specification using, for example, the 7zip method with a password if necessary, and presses the next button M4*c*. Then, a confirmation window in which the input project name, file name, and the like are displayed in a list is displayed. If there is no problem in the contents, the input information and the file of communication specification are transferred to the providing system 1 by pressing the Submit button M5. That is, the request to generate new vehicle software is completed.

Figure 10:
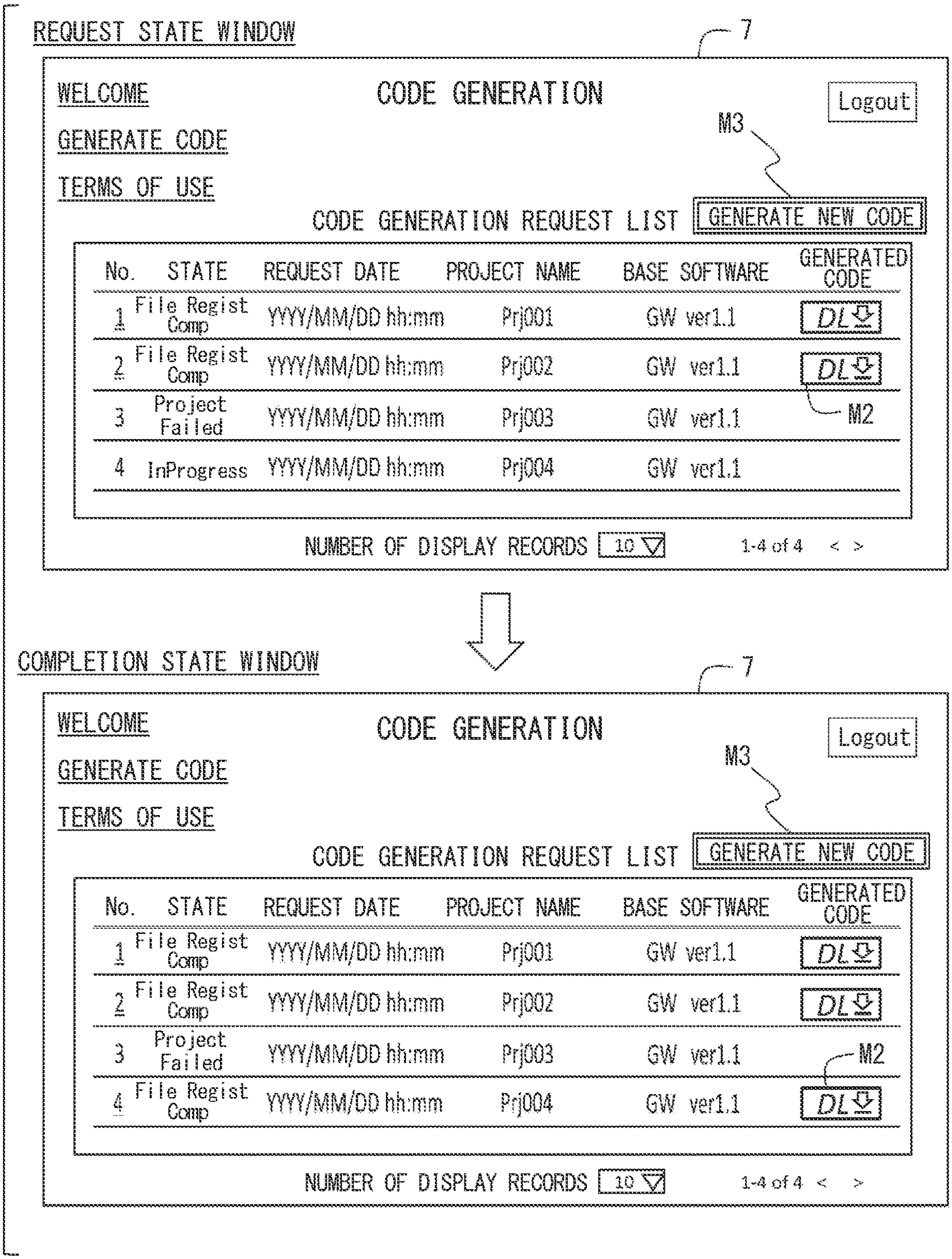
FIG. 10 is a diagram showing an exemplary operation window when development is requested and an exemplary operation window when development is completed.

The window of operation terminal 7 transitions to the request state window illustrated in FIG. 10, and the state of requested fourth project is displayed as "In Progress", which indicates that the generation request of vehicle software is received. Then, the request side waits whether the state becomes "File Regist Comp" or "Project Failed". Note that the providing system 1 may be configured to notify by e-mail when the generation of vehicle software is completed or fails. Therefore, the request side does not necessarily have to wait on this window.

As shown in FIG. 11, the input information is notified to the providing system 1 as package information. The package information is information for specifying vehicle software to be developed (also referred to as target vehicle software), and constitutes update data together with the attached communication specification, that is, update information. That is, the update data is input to the providing system 1 by the above-described procedure. Note that the package information is merely an example, and the package information may be in a format including other information such as designating of target hardware.

When the update data is input, as shown in S3 of FIG. 7, that is, S3: YES, the providing system 1 determines whether the update data is correct in S4. In S4, as described above, the providing system checks whether the correspondence between the package information and the update information and the format of update information, that is, the communication specification are correct. In response to determining that the update data is not correct (S4: NO), the providing system 1 notifies, to the mail address of request side, of the error in the update data, and sets the state in request state window shown in FIG. 10 to "Project Failed" in S5.

The providing system 1 can reduce the confirmation and inquiry of the specification by the person in charge on the development side, which are necessary in the conventional procedure. The request side can grasp an error in the update data immediately after inputting the update data, and can quickly review the communication specification.

When the update data is determined to be correct (S4: YES), the providing system 1 transfers the update data to the development environment 4 of the vehicle software, which is specified based on the package information in S6. In this case, when the development environment 4 is configured by one development device 2, the update data is used as it is. When there are multiple development devices 2 or the check unit 33 is provided on the cloud server 8, the update data is transferred to the development device 2 corresponding to the target vehicle software.

Figure 12:
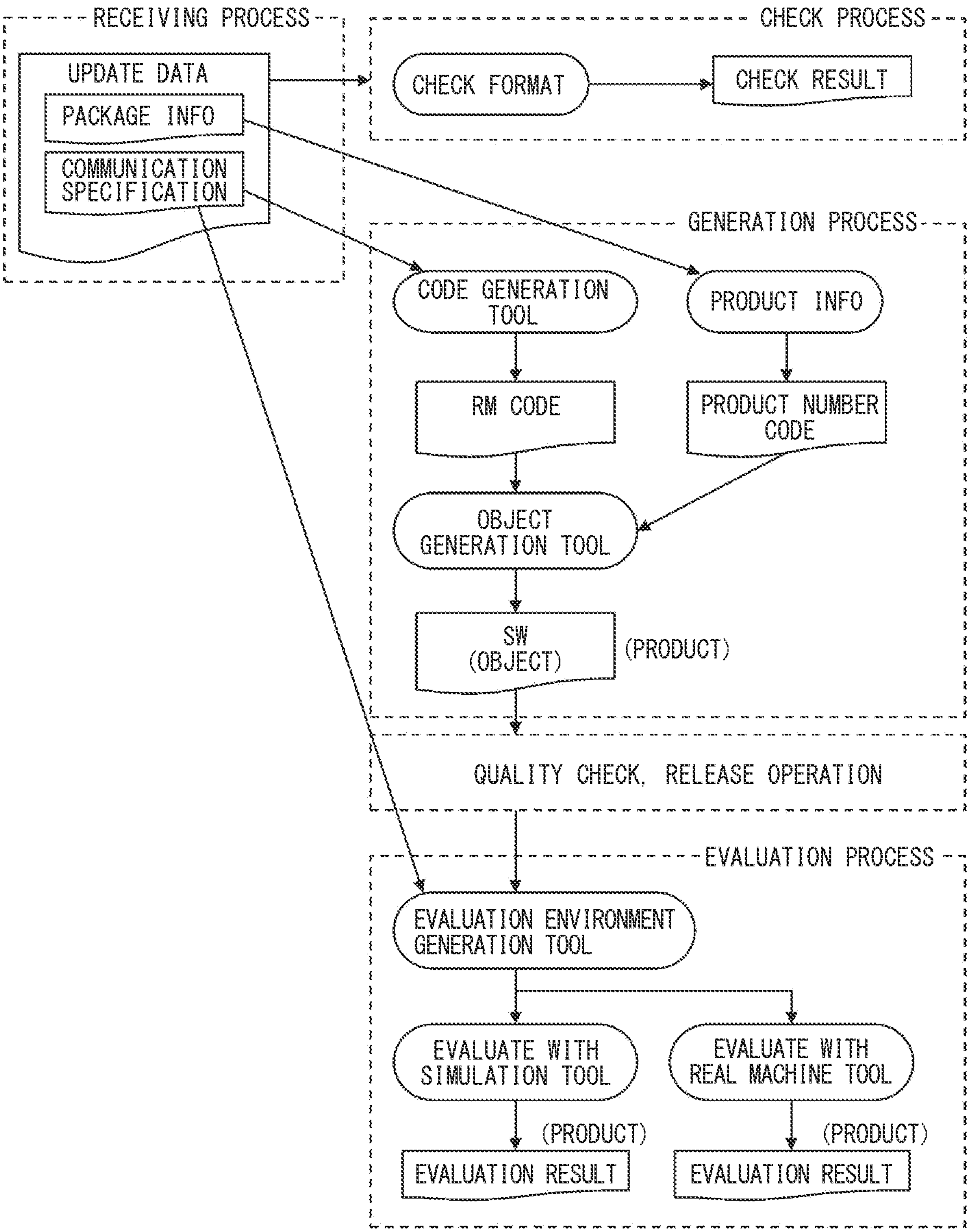
FIG. 12 is a diagram for explaining a development process in the development device.

The providing system 1 instructs generation of vehicle software to generate the vehicle software in which the update data is reflected in S7. The providing system 1 newly generates the vehicle software in the flow illustrated in FIG. 12. The providing system 1 acquires a communication path by analyzing the communication specification, and generates a source code for the routing map corresponding to the communication path using the code generation tool 35*a*. In FIG. 12, the source code for the routing map is indicated as RM code. The providing system 1 acquires necessary source code, such as product number code based on the package information.

The providing system 1 generates the vehicle software by the object generation tool 35*b*. The vehicle software indicated as SW in FIG. 12 is generated as an execution object executable on the evaluation board 3. The providing system 1 instructs the quality check of vehicle software in S8 as illustrated in FIG. 7. In S8, the quality of generated vehicle software is checked. For example, the generated code and the object size of the vehicle software are checked. As illustrated in FIG. 12, the providing system 1 also performs a release operation of collecting vehicle software as a product, a log at the time of generation, and the like.

When the generation of vehicle software is completed, the providing system 1 instructs the evaluation of vehicle software in S9. In S9, as shown in FIG. 12, test data and expected values are generated by the evaluation environment generation tool 36*a* based on the communication specification, and the operation of vehicle software is evaluated by the simulation tool 36*b*. Then, a simulation result is acquired as the product in S10 as illustrated in FIG. 7. The simulation result corresponds to the evaluation result.

The providing system 1 determines whether to perform evaluation on the real machine, that is, on the evaluation board 3 in S11. The evaluation using the real machine is performed, for example, in a case where the evaluation is included in the contract content of the service to be provided or in a case where the evaluation is requested at the time of development request although illustration is omitted. In a case where the evaluation is performed in the real machine (S11: YES), the providing system 1 downloads the vehicle software to the real machine and instructs the evaluation of operation in the real machine in S12. In S12, as shown in FIG. 12, the operation of vehicle software in the real machine is evaluated by the real machine test tool 36*c*. Then, the operation result in the real machine, which corresponds to the product, is acquired as an evaluation result in S13 as illustrated in FIG. 7.

In the evaluation performed in the real machine, the providing system 1 can evaluate the operation by writing the vehicle software in the real machine instead of downloading the vehicle software. In the case of embedded software, such as vehicle software, free writing to a real machine is generally restricted from the viewpoint of security. For this reason, in the related art, when it is desired to verify the operation in the real machine, there is no choice but to request the development side. Since the providing system 1 uses the development environment 4 on the development side, writing the vehicle software to the real machine can be executed. That is, the request side can acquire the evaluation result of vehicle software written in the real machine by using the providing service.

The vehicle software includes software used in a hard real-time system and software used in a soft real-time system. A large number (for example, 20 to 100 or more) of electronic control units having not only different functions and performances but also different architectures are mounted on one vehicle. Therefore, verifying the operation of the vehicle software by using a real machine or a simulation tool is advantageous in securing the software quality.

When the evaluation result is acquired, the providing system 1 determines whether it is necessary to provide the vehicle software in S14. In S14, the providing system 1 determines that it is required to provide the vehicle software (S14: YES) and provides the generated vehicle software and the evaluation result in S15 when the providing of vehicle software is required in the contract content of the providing service or when the providing of vehicle software is required at the time of development request being made.

When the providing system 1 determines that it is not required to provide the vehicle software (S14: YES), the providing system 1 provides the evaluation result in S16. For example, in a stage where a change in a communication path is considered, there is a demand for first grasping a rough influence of the change rather than an actual operation of the vehicle software after the change. Therefore, the providing system 1 provides the evaluation result without including the vehicle software. That is, the providing system 1 has a configuration that can adjust a providing method of an evaluation result of vehicle software. After the vehicle software or the evaluation result is provided as described above, the providing system 1 ends a series of processes related to the requested generation of vehicle software. In the actual providing system 1, the process returns to S3 and waits for input of the next update data.

Basic data is already registered in the development device 2. Therefore, in the next update of the vehicle software, new vehicle software is generated using the update data input from the request side and the information other than the update data stored in the storage 21. Then, the updated vehicle software is provided to the request side. In other words, when the vehicle software is updated, the request side does not need to provide all the information related to the development of vehicle software to the development side. The request side may provide the development side with information specifying the vehicle software to be updated including the version and information indicating the update portion. The information specifying the vehicle software to be updated includes the version, the package information, or base software information. The information indicating the update portion is a file described in a predetermined format, such as a spreadsheet software file, an ARXML format file, or a JSON format file.

When the generation of vehicle software is completed, the request side is notified of the completion by, for example, electronic mail. When the person in charge on the requesting side logs into the providing system 1 from the operation terminal 7, a completion state window illustrated in FIG. 10 is displayed. On the completion state window, the state of fourth project requested last time is "File Regist Comp", and a download button M2 is displayed at the generation code, indicating that the generation of vehicle software is completed. At this time, a link schematically indicated by an underline is attached to the number of requested projects, and when the number is clicked, the same window transition as when the download button M2 is pressed occurs. If an error occurs for some reason, the error is notified.

Figure 13:
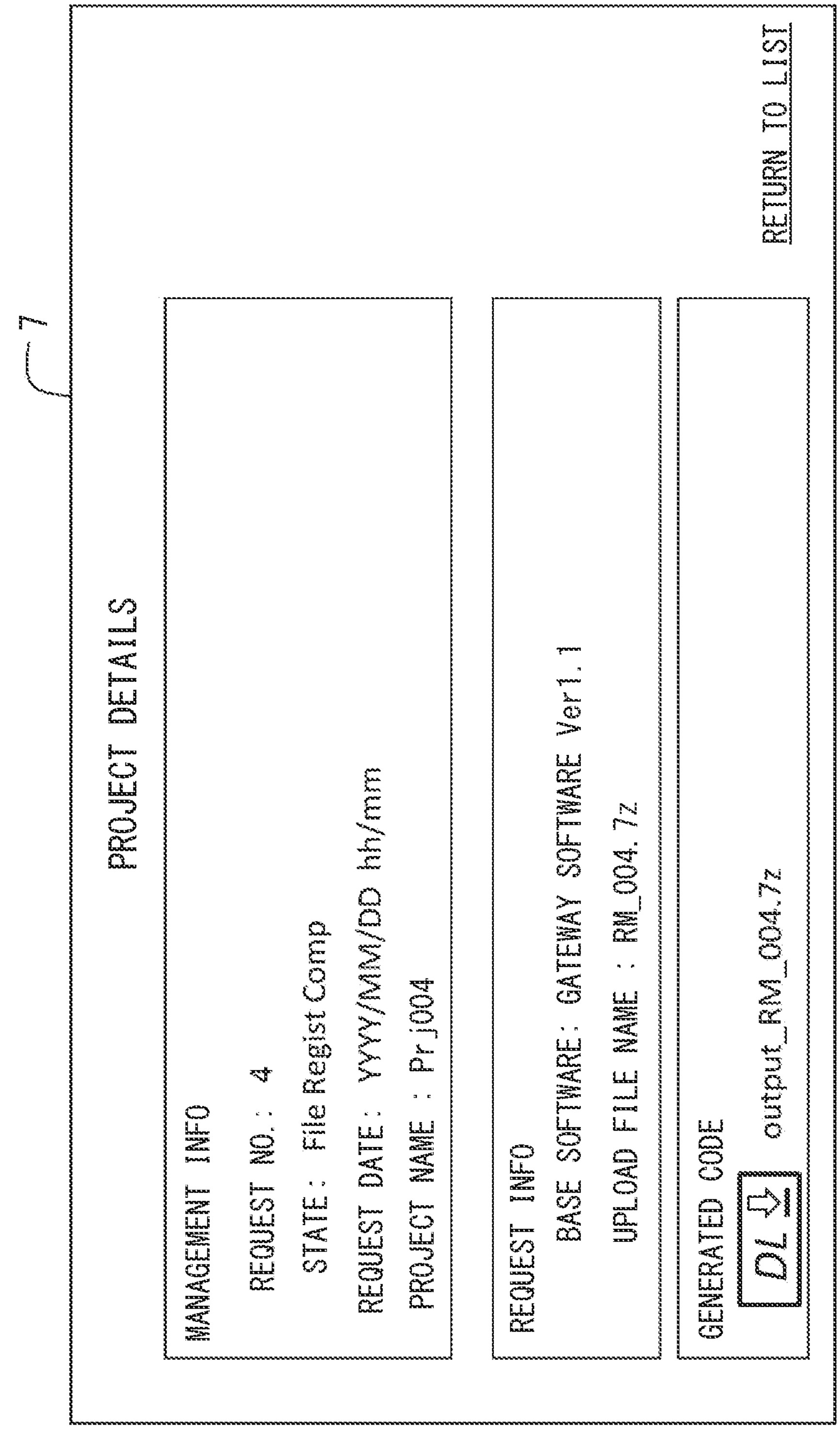
FIG. 13 is a diagram showing an example of a window for acquiring a product.

Then, by pressing the number or download button M2, a project details window shown in FIG. 13 is displayed. After confirming the contents of the project, it is possible to download the file in which the products are collected. In the case of FIG. 13, the collected products is indicated by a file name of output_RM_004.7z.

Figure 14:
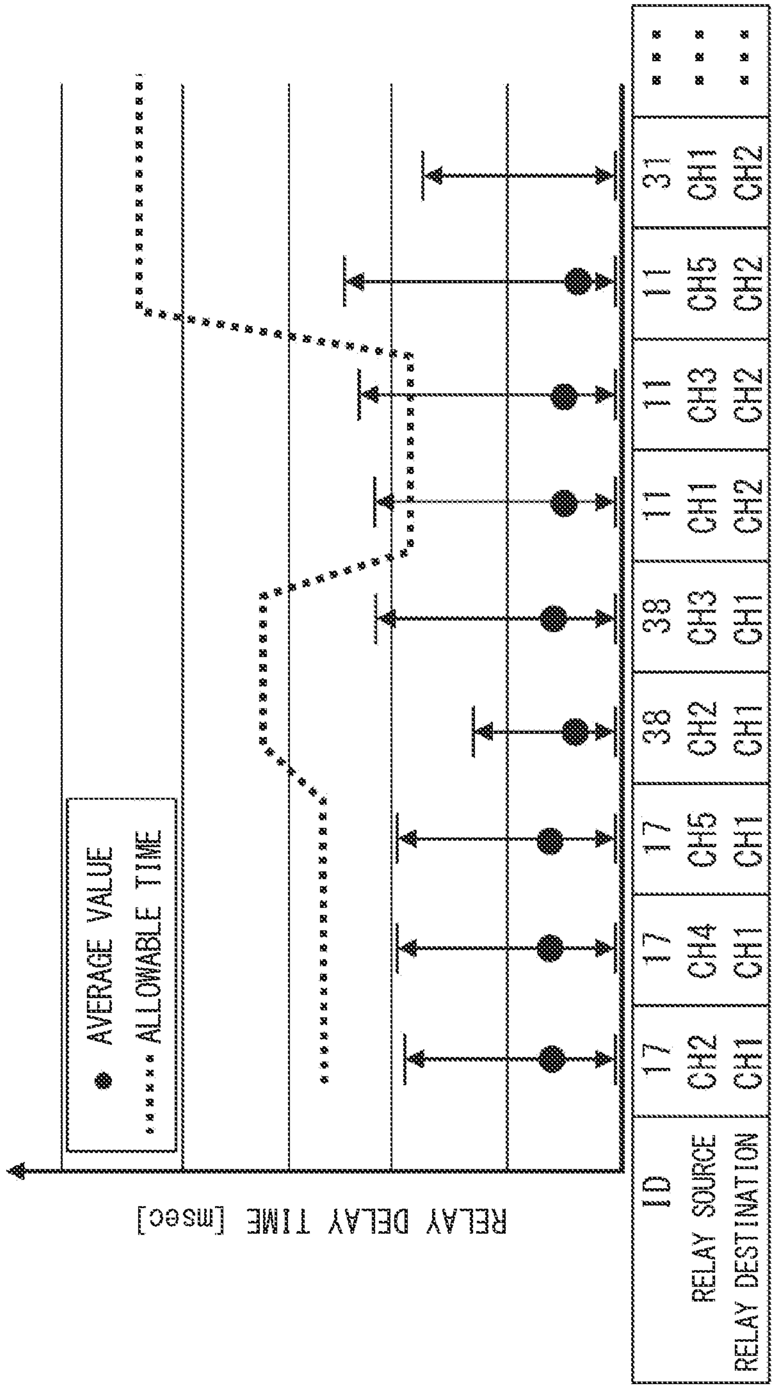
FIG. 14 is a diagram showing an example of an evaluation result as a product.

The products include an object of vehicle software in a format that can be downloaded to the evaluation board 3 and can be executed, a log at the generation time, an evaluation result, and the like. As shown in FIG. 14, as the evaluation result, data in which the relay delay time occurred in relay of each frame ID is summarized in the form of spreadsheet software is provided. The relay delay time is a time required from when the communication frame of the corresponding frame ID is received to when the communication frame is relayed to the corresponding relay destination.

In FIG. 14, for example, the time required for relaying the communication frame having the frame ID of "17" is indicated by bars with the maximum value and the minimum value, and a black circle indicates the average value. The communication frame having the frame ID of "17" is received on the channel 1, and is relayed to the channels 2, 4, and 5 as the relay destinations. In FIG. 14, the allowable time for relaying each frame ID is indicated by a broken line. By referring to the evaluation result, the request side can grasp the communication status when the communication route is changed. In addition, by requesting different projects and acquiring evaluation results of different communication paths, it is possible to grasp a tendency when a communication path is changed, that is, it is possible to determine the validity of path change.

As described above, the providing system 1 is configured to automatically perform a series of processes of generating new vehicle software in which update data is reflected, evaluating the vehicle software, and providing the vehicle software or an evaluation result thereof, in response to input of the update data from the request side. Thus, as shown in FIG. 6 as an embodiment, it is possible to reduce man-hours on the development side when developing the vehicle software. Further, it is possible to quickly provide the vehicle software in which the update data, that is, the request content is reflected.

Figure 15:
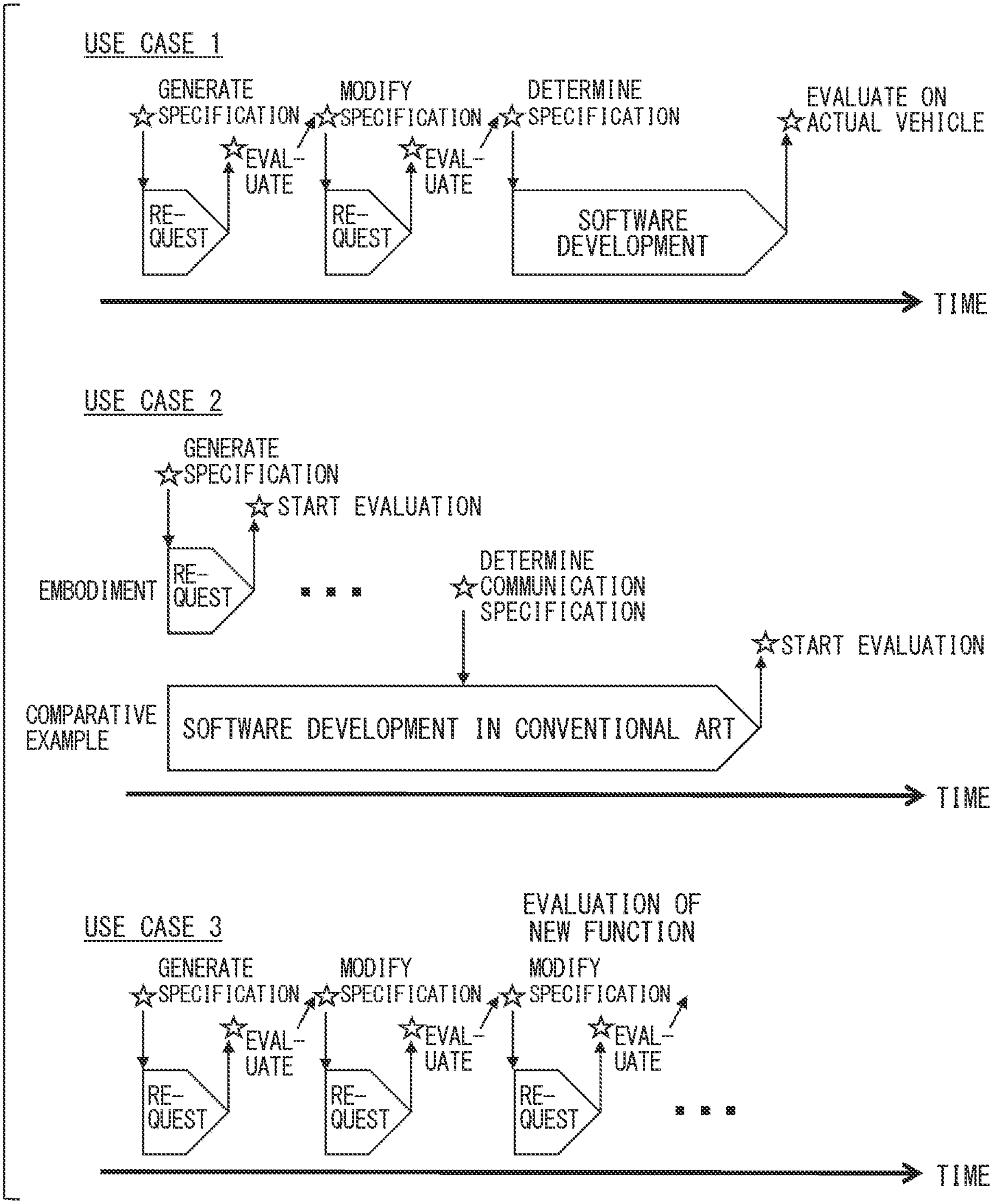
FIG. 15 is a diagram showing a use example of the providing system.

By using the providing system 1 and the providing method, as shown in a use case 1 of FIG. 15, it is possible to obtain an evaluation result of communication state at a stage before a final determination of the specification. Further, it is possible to perform correction again on the basis of the communication delay time or the like. Thus, it is possible to consider a change in the communication path before the specification is finally determined. In the related art, evaluation result of change in the communication path cannot be grasped until the communication path is mounted on an actual vehicle.

As illustrated in a use case 2 of FIG. 15, it is possible to delay the determination time of communication specification. In a normal development process, it is assumed that it takes a certain amount of time until development of vehicle software is completed and evaluation is started. In the use case 2, it is possible to evaluate the communication path in advance by using the providing service in a period until the development is completed. Thus, it is possible to delay the time when the communication specification is finally determined from the time of the development request, and it is possible to develop the vehicle software in a state of being examined in more detail.

As illustrated in a use case 3 of FIG. 15, the providing service can be used when a new function is required to be examined. For example, in the communication path shown in FIG. 2, in a case where the communication performance fails to reach an expected performance when a certain communication node 11 is replaced, a try using a different communication path is expected. In this case, if the providing service is used, the evaluation result when the communication path is changed can be acquired quickly and repeatedly by many times. Therefore, sufficient examination can be repeated until the specification is finally determined.

According to the above-described embodiment, the following effects can be obtained.

In the present disclosure, the providing method of vehicle software includes: registering various types of information necessary for vehicle software generation as basic data in association with target vehicle software; receiving update data including package information and update information, the package information specifying the target vehicle software, and the update information indicating update contents for the basic data and being described in a predetermined format; checking a format of the received update data; specifying the target vehicle software based on the update data; transferring the update data to a development environment of the specified target vehicle software; instructing generation of new vehicle software in which the update data is to be reflected; generating the new vehicle software in which the update data is reflected; and providing the generated new vehicle software.

When the update data is input by the request side, new vehicle software reflecting the update data can be automatically generated and provided. Therefore, it is possible to reduce man-hours on the development side when developing the vehicle software, and it is possible to quickly provide the vehicle software in which the update data, that is, the requested content is reflected.

In the above providing method of vehicle software, the update data is received via a web interface accessible from the outside via a network. In the providing of new vehicle software, the vehicle software is provided via the web interface. Thus, it is not necessary to manually transfer the update data to the development side. The request side can provide the update data at any time, and request for generation of vehicle software at any time. Therefore, both the request side and the development side can share the advantage of the providing system. In the development of OEM product as described in the above embodiment, usually, a company corresponding to request side is different from a company corresponding to development side, this advantage becomes more significant.

The providing method of vehicle software further includes: instructing evaluation of the new vehicle software; acquiring an evaluation result of the vehicle software by performing a simulation of the vehicle software; and providing the evaluation result. Thus, when examining different specification changes, it is possible to obtain and verify the respective evaluation results, and it is possible to quickly and easily determine the goal of specification change.

The providing method of vehicle software further includes: instructing evaluation of the vehicle software in the real machine; downloading the vehicle software to the real machine; acquiring an evaluation result acquired in the real machine, and providing the evaluation result. Thus, the operation result of actual vehicle software in real machine, such as vehicle can be verified.

In the above providing method of vehicle software, the basic data includes a parameter used in the vehicle software, and the update data is used for changing the parameter. In the case of requesting a simple specification change such as a parameter change, unlike the conventional art, it is not necessary for the request side to follow a regular request procedure. With the above embodiment, it is possible to shorten the time required to obtain the vehicle software in which the change content is reflected.

In the above providing method of vehicle software, the vehicle software controls the relay device 10 that relays data to be transmitted and has been received through the in-vehicle network. The basic data includes the routing map in which the relay source and the relay destination are defined by fixed values, and the update data instructs a change to the routing map. When a simple specification change, such as the change of routing map described in the embodiment is requested, unlike the conventional art, it is not necessary for the request side to follow a regular request procedure in the above-described providing method of vehicle software. Thus, it is possible to shorten the time required until the vehicle software in which the change content is reflected is obtained.

According to another aspect of the present disclosure, a providing method of vehicle software evaluation result includes: registering various types of information necessary for vehicle software generation as basic data; receiving update data including package information and update information, the package information specifying target vehicle software, and the update information indicating update contents of the basic data and being described in a predetermined format; checking a format of the received update data; specifying the target vehicle software based on the update data; transferring the update data to a development environment of the specified target vehicle software; generating new vehicle software in which the update data is reflected; instructing evaluation of the new vehicle software; and providing an evaluation result of the new vehicle software.

With the above providing method of vehicle software, when the update data is input by the request side, the new vehicle software in which the update data is reflected can be automatically evaluated, and the evaluation result can be provided to the request side. Therefore, it is possible to reduce man-hours on the development side when developing the vehicle software, and it is possible to quickly provide the evaluation result of the vehicle software in which the update data, that is, the request content is reflected.

According to another aspect of the present disclosure, a providing system of vehicle software includes: a registration unit that registers various kinds of information necessary for vehicle software generation as basic data in association with target vehicle software; a receiving unit that receives update data including package information and update information, the package information specifying the target vehicle software, and the update information indicating update contents for the basic data and being described in a predetermined format; a check unit that checks a format of the received update data; an instruction unit that specifies the target vehicle software based on the update data, transfers the update data to a development environment of the specified target vehicle software, and instructs generation of new vehicle software in which the update data is to be reflected; a generation unit that generates the new vehicle software in which the update data is reflected based on instruction from the instruction unit; and a providing unit that provides the generated new vehicle software.

With the above providing system, when the update data is input by the request side, a series of processes from generation of new vehicle software to providing of new vehicle software in which the update data is reflected can be automatically performed. Therefore, it is possible to reduce man-hours on the development side when developing the vehicle software, and it is possible to quickly provide the vehicle software in which the update data, that is, the request content is reflected. Thus, it is possible to obtain the same effects as those of the above-described providing method.

In the providing system of vehicle software and the providing method of vehicle software, the source code of vehicle software may be included in the basic data, the content instructing a change to the source code may be included in the update data. The process illustrated in FIG. 7 may be executed to enable a change to the source code. According to such a configuration, when the update data is input by the request side, a series of processes from generation of new vehicle software to providing of new vehicle software in which the update data is reflected can be automatically performed. Therefore, it is possible to reduce the man-hours on the development side when developing the vehicle software, and it is possible to quickly provide the vehicle software in which the update data, that is, the requested content is reflected and the evaluation result thereof. Thus, it is possible to obtain the same effects as those of the above-described providing method.

Various effects similar to those of the above-described providing method and providing system 1 can also be obtained by a providing program of vehicle software, which causes the control unit 20 of the development device 2 in the development environment 4 to execute each process included in the above-described providing method. The development environment 4 may be configured to include multiple devices that execute the above-described process in a separated manner in individual devices.

Figure 16:
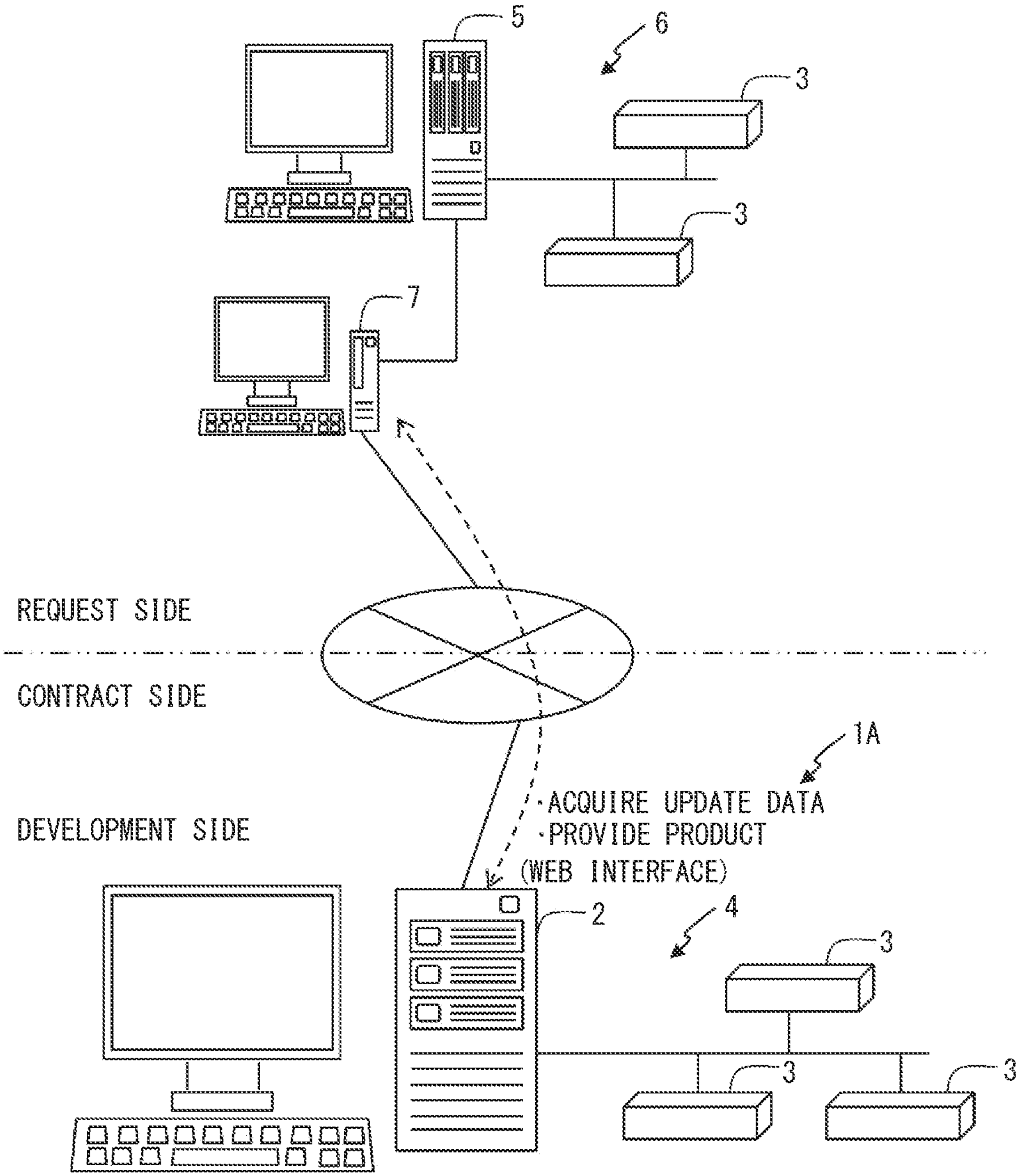
FIG. 16 is a diagram showing another schematic configuration of the providing system.
Figure 17:
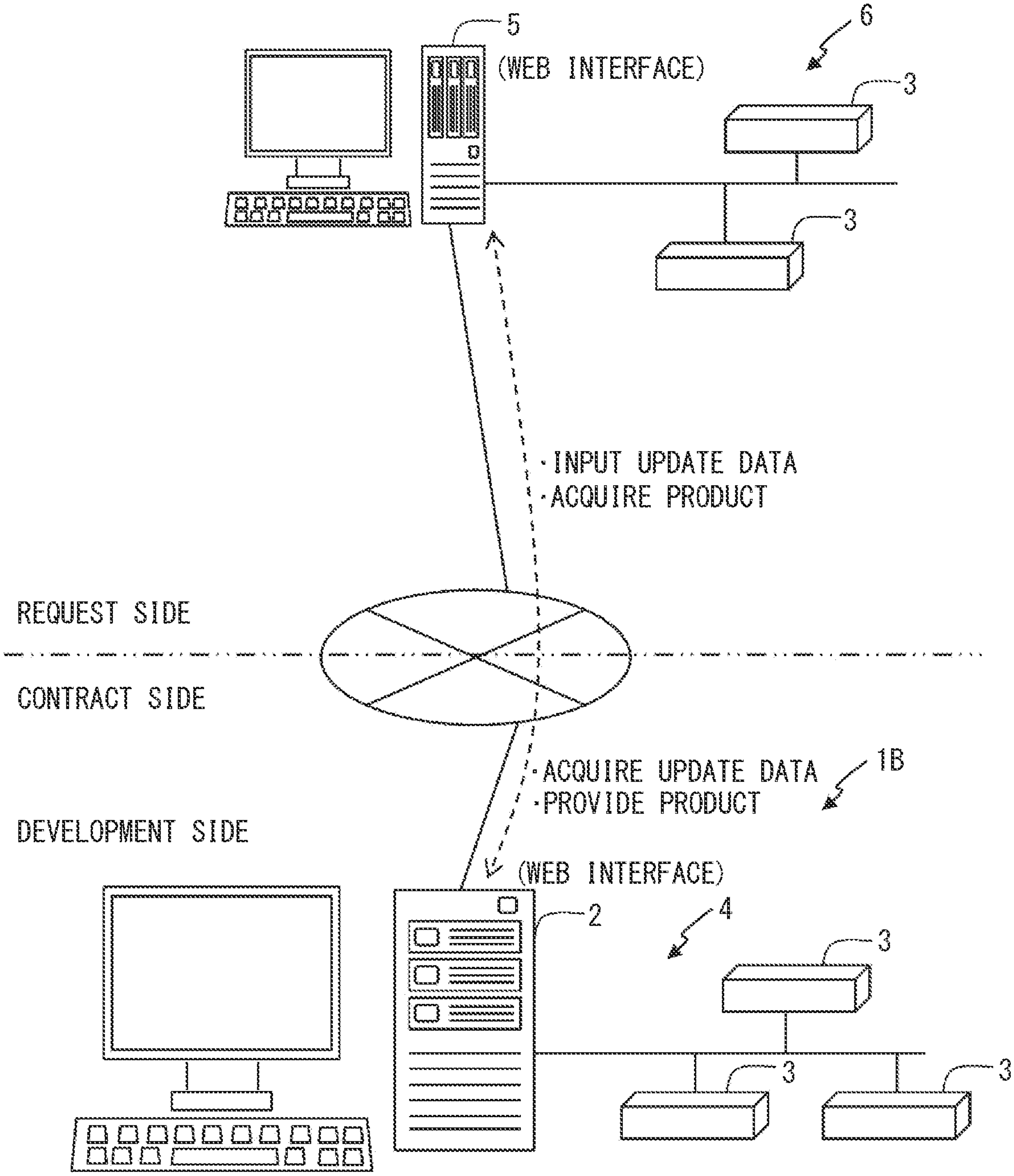
FIG. 17 is a diagram showing another schematic configuration of the providing system.

The file transfer between the request side and the development side may be performed directly, which is different from the indirect file transfer via the cloud service as described in the embodiment. For example, as shown in FIG. 16, by using a providing system 1A in which a web interface function corresponding to the interface unit 9 is provided in the development device 2, a file can be directly transferred from the request side to the development side. Alternatively, as shown in FIG. 17, by using a providing system 1B in which a web interface function is provided in the development device 2 and the evaluation device 5, a file can be directly transferred from the evaluation device 5 on the request side to the development side. Even with such a configuration, it is possible to obtain the same effects as those of the providing system 1 described in the above embodiment.

The file transfer between the request side and the development side is performed via the interface unit 9. The interface unit 9 and the development environment 4 are configured to exchange files. Since it is possible to restrict which function of the development environment 4 is opened to the interface unit 9, it is possible to improve the convenience of the request side while maintaining the information security.

The control unit and the method thereof described in the present disclosure may be implemented by a dedicated computer provided by configuring a processor and a memory programmed to execute one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of (i) a processor and a memory programmed to execute one or more functions and (ii) a processor configured by one or more hardware logic circuits. The computer program may be stored in a computer-readable non-transitory tangible storage medium as instructions to be executed by a computer.

What is claimed is:

1. A method of providing vehicle software comprising:

registering, by a development device, various types of information necessary for vehicle software generation as basic data in association with target vehicle software, the various types of information necessary for vehicle software generation being input by a request party that determines a specification of the vehicle software and requests development of the vehicle software, the request party being different from a providing party that actually performs development of the vehicle software using the development device and provides the developed vehicle software to the request party;

receiving, by the development device, update data including package information and update information, the package information specifying the target vehicle software, and the update information indicating update contents for the basic data and being described in a predetermined format, the update data being input by the request party;

checking, by the development device, a format of the received update data;

specifying, by the development device, the target vehicle software based on the update data;

transferring, by the development device, the update data to a development environment of the specified target vehicle software;

instructing, by the development device, generation of new vehicle software in which the update data is to be reflected;

generating, by the development device, the new vehicle software in which the update data is reflected; and providing, to the request party, the new vehicle software generated by the development device.

2. The method according to claim 1, wherein:

in receiving of the update data, the update data is received via a web interface accessible from outside via a network, and in providing of the generated new vehicle software, the new vehicle software is provided via the web interface.

3. The method according to claim 1, further comprising:

instructing, by the development device, evaluation of the new vehicle software;

acquiring, by the development device, an evaluation result of the new vehicle software by performing simulation; and providing, to the request party, the evaluation result acquired by the development device.

4. The method according to claim 1, further comprising:

instructing, by the development device, evaluation of the new vehicle software in a real machine;

downloading, by the development device, the new vehicle software to the real machine and acquiring an evaluation result generated by the real machine; and providing, to the request party, the evaluation result acquired by the development device.

5. The method according to claim 1, wherein;

the basic data includes a parameter to be used in the new vehicle software, and the update data is used to change the parameter of the basic data.

6. The method according to claim 1, wherein:

the target vehicle software controls a relay device, the relay device relays data, which is transmitted or received through an in-vehicle network, the basic data includes a routing map in which a relay source and a relay destination of data are defined by fixed values, and the update data instructs a change to the routing map.

7. The method according to claim 1, wherein:

the basic data includes source code of the target vehicle software, and the update data instructs a change to the source code.

8. A method of providing a vehicle software evaluation result comprising:

registering, by a development device, various types of information necessary for vehicle software generation as basic data, the various types of information necessary for vehicle software generation being input by a request party that determines a specification of vehicle software and requests development of the vehicle software, the request party being different from a providing party that actually performs development of the vehicle software using the development device and provides the developed vehicle software to the request party;

receiving, by the development device, update data including package information and update information, the package information specifying target vehicle software, and the update information indicating update contents of the basic data and being described in a predetermined format, the update data being input by the request party;

checking, by the development device, a format of the received update data;

specifying, by the development device, the target vehicle software based on the update data;

transferring, by the development device, the update data to a development environment of the specified target vehicle software;

generating, by the development device, new vehicle software in which the update data is reflected;

instructing, by the development device, evaluation of the new vehicle software; and providing, to the request party, an evaluation result of the new vehicle software generated by the development device.

9. A system comprising:

at least one processor with a memory storing computer program, the at least one processor with the memory being configured to:

register various types of information necessary for vehicle software generation as basic data in association with target vehicle software, the various types of information necessary for vehicle software generation being input by a request party that determines a specification of vehicle software and requests development of the vehicle software, the request party being different from a providing party that actually performs development of the vehicle software using a development device and provides the developed software to the request party;

receive update data including package information and update information, the package information specifying the target vehicle software, and the update information indicating update contents for the basic data and being described in a predetermined format, the update data being input by the request party;

check a format of the received update data;

specify the target vehicle software based on the update data, transfer the update data to a development environment of the specified target vehicle software, and instruct generation of new vehicle software in which the update data is to be reflected;

generate the new vehicle software in which the update data is reflected; and provide the generated new vehicle software to the request party.

10. A method of providing vehicle software comprising:

registering various types of information necessary for generation of vehicle software as basic data in association with target vehicle software, the vehicle software being provided in a development tool that is used to develop the vehicle software to be installed in an electronic control device mounted on a vehicle;

receiving update data including package information and update information, the package information specifying the target vehicle software, and the update information indicating update contents for the basic data and being described in a predetermined format;

checking a format of the received update data;

specifying the target vehicle software based on the update data;

transferring the update data to a development environment of the specified target vehicle software;

instructing generation of new vehicle software in which the update data is to be reflected;

generating the new vehicle software in which the update data is reflected; and outputting and displaying the generated new vehicle software on a display device;

wherein:

the target vehicle software controls a relay device;

the relay device relays data, which is transmitted or received through an in-vehicle network;

the basic data includes a routing map in which a relay source and a relay destination of data are defined by fixed values;

the update data instructs a change to the routing map; and the update information includes a communication specification that describes relay operation executed by the relay device as a specification.

* * * * *